United States Patent
Satterwhite et al.

[15] 3,678,958
[45] July 25, 1972

[54] CHECK VALVE

[72] Inventors: Lawrence E. Satterwhite; Alton M. Williamson; George R. Shindler, all of Houston, Tex.

[73] Assignee: FMC Corporation, San Jose, Calif.

[22] Filed: Sept. 16, 1970

[21] Appl. No.: 72,961

[52] U.S. Cl................137/512.1, 137/512.5, 137/515.7
[51] Int. Cl...............................................F16k 15/00
[58] Field of Search...............137/512, 512.1, 512.5, 515.7, 137/515, 454.2, 527, 527.4, 516.29

[56] References Cited

UNITED STATES PATENTS

| | | | |
|---|---|---|---|
| 3,276,471 | 10/1966 | Hagner | 137/527 |
| 3,378,030 | 4/1968 | Cary | 137/516.29 |
| 3,007,488 | 11/1961 | Wheeler | 137/512.1 X |
| 3,072,141 | 1/1963 | Wheeler | 137/527.4 X |
| 3,395,727 | 8/1968 | Weise et al | 137/515.7 X |
| 3,452,778 | 7/1969 | Babcock | 137/512.1 |
| 3,538,946 | 11/1970 | Hilsheimer | 137/512.1 |

Primary Examiner—M. Cary Nelson
Assistant Examiner—David J. Zobkiw
Attorney—F. W. Anderson, C. E. Tripp and W. W. Ritt, Jr.

[57] ABSTRACT

A flapper or wafer-type check valve with two half-disc flapper or wafer closure elements pivotally mounted in the valve body by hinges on a shaft extending transversely of the valve's flow passage, and shaft guides that removably but securely retain the shaft in the valve body while facilitating limited movement of the shaft parallel to the flow passage axis. The curved and straight peripheries of the flappers close against a seat on the valve body comprising an annular shoulder extending into the flow passage and a transverse rib that extends across the flow passage parallel to the shaft. When opening from a closed position, the flappers first lift off the seat in the area of the hinges before they begin to pivot about the shaft, and as the flappers close they come to rest against the hinge area of the seat without sliding or rubbing against it, thereby avoiding wear of the seat. In addition, several different systems for securing the shaft guides to the valve body are disclosed, as are valves with resilient seats mounted on the flappers, on the valve body, and also valves with non-resilient seats.

17 Claims, 15 Drawing Figures

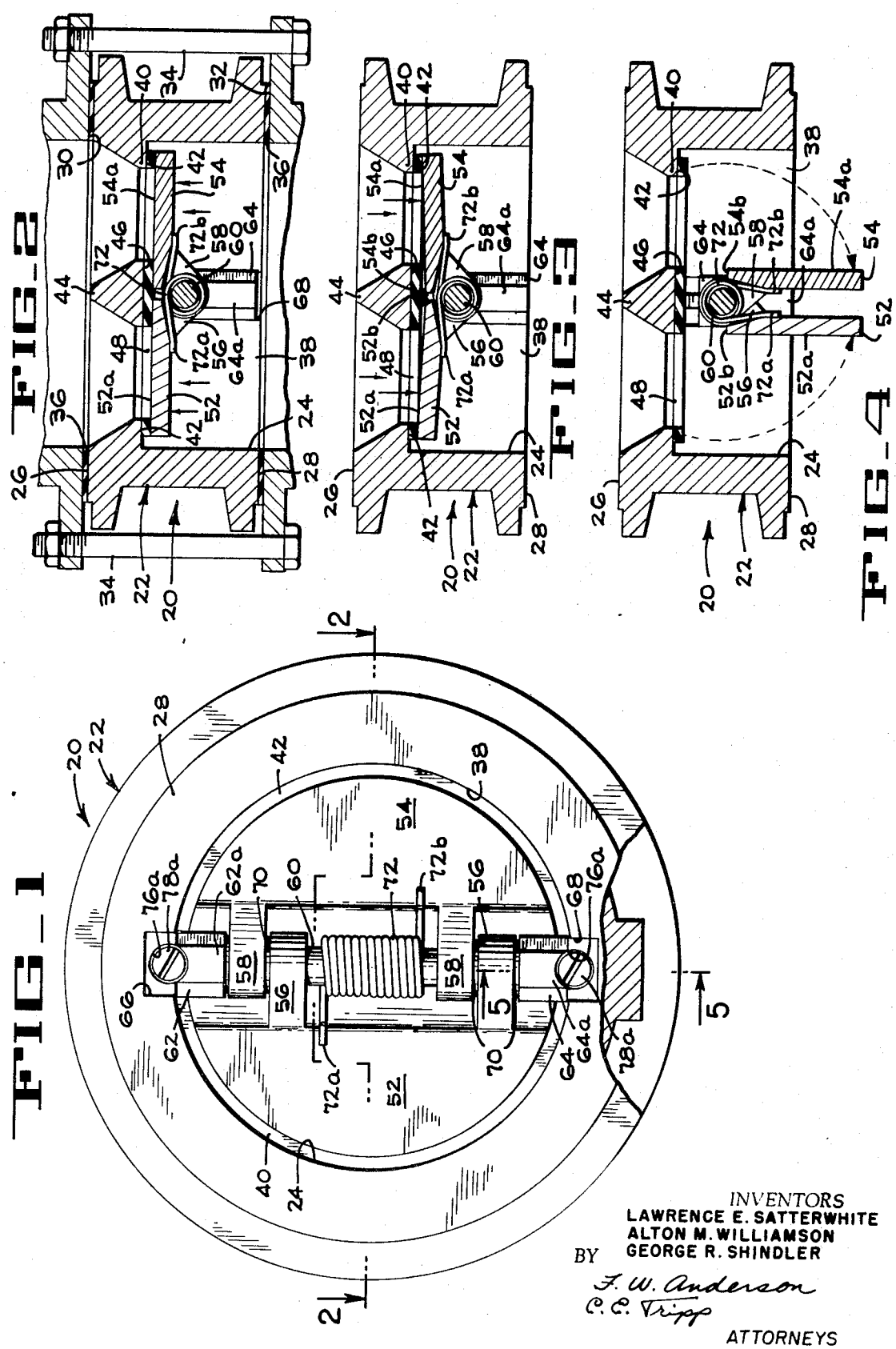

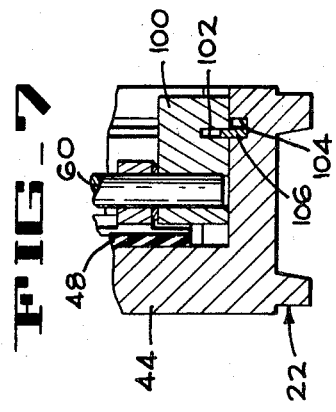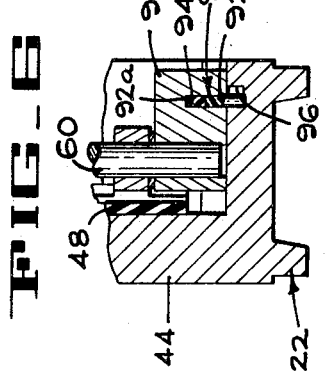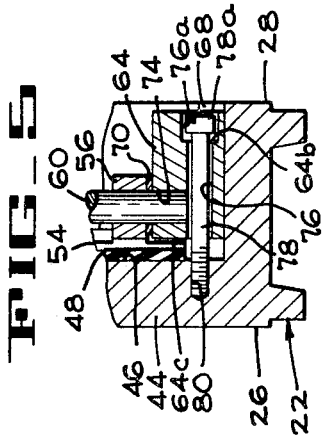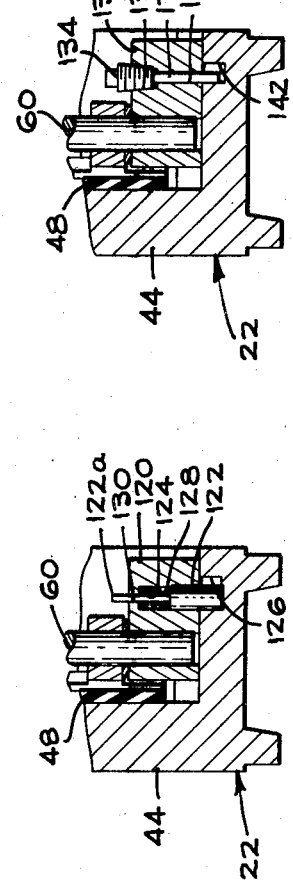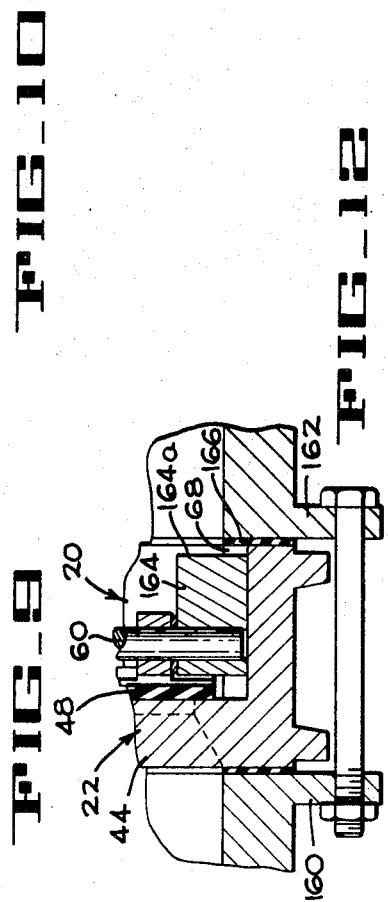

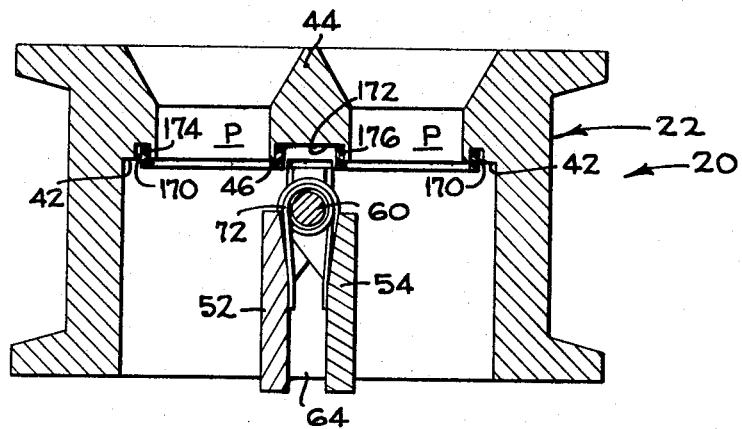
FIG_13
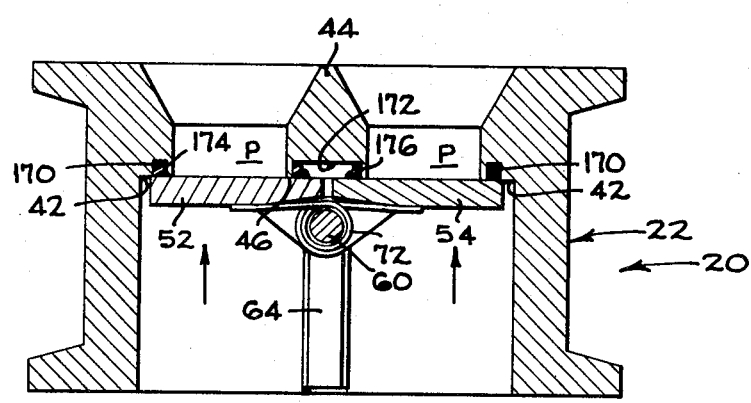
FIG_14
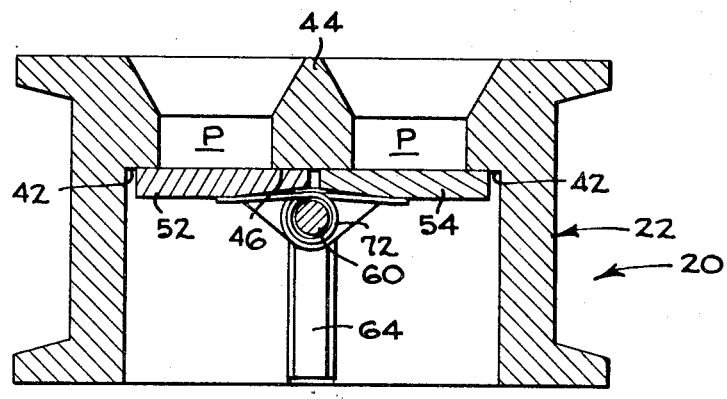
FIG_15

3,678,958

CHECK VALVE

BACKGROUND OF THE INVENTION

The field of art to which the present invention pertains includes check valves with closure elements of the flapper or wafer variety, wherein the flappers or wafers are pivotally mounted on a shaft for movement between open and closed positions in the valve's flow passage in response to change in direction of the fluid flowing through the valve. The invention also relates to check valves of the aforementioned type wherein the flappers are spring-biased towards their closed position, and to systems that facilitate opening and closing of the flappers without causing wear of the valve seat, be it resilient or non-resilient.

The flapper or wafer-type check valve has found wide acceptance in many industries where automatic prevention of reverse fluid flow in a pipe line or other such conduit is required. However, unless the flappers are somehow able to lift off, i.e., move perpendicularly away from, the surface of the valve's seat before they begin to pivot about their supporting shaft into an open position, they slide or rub on the hinge area of the seat during the initial phase of their opening movement, thereby causing undesirable abrasion and wear of this vital seat element. Since this same type of wear also occurs during closure of the flappers as they complete their pivotal movement about the shaft, the life of the seat in a valve of this type is undesirably shortened, especially where the seat is constructed of resilient material and used in very active service.

Numerous attempts have been made to overcome this problem, and patents have been granted on several proposed solutions thereof, including U.S. Pats. Nos. 3,007,488, 3,026,901, 3,072,141, and 3,074,427, all issued to Joseph S. Wheeler, Jr. Seat wear allegedly is reduced in some valves of this type by extending the ends of the closure spring outward past the centroid of the flappers, and elongating the holes in the flappers' hinges and the valve's body through which the supporting shaft passes. It has been found that such elongated holes are undesirable, primarily because the small contact area between the shaft and the holes tends to increase the size of the holes during operation of the valve, utilimately requiring replacement of the flappers and on occasion, the valve's body itself. Furthermore, mounting the shaft in holes extending entirely through the wall of the body is undesirable, for leakage can occur through these holes in the absence of adequate seals, thereby increasing the cost of maintenance.

SUMMARY

Faced with the foregoing problems, and as a result of efforts to solve them, applicants have invented a new flapper-type check valve that employs a novel system for supporting and retaining the flappers in the valve body. More particularly, this invention involves securing the shaft, upon which the flappers are pivotally mounted, to guides that are retained in elongated grooves that extend in an axial direction in the bore or flow passage of the valve body. The guides are able to move in these grooves a limited distance in the direction of the flow passage's axis, so that the flappers lift off of the valve seat in the area of the hinges before they begin to pivot, thereby avoiding all sliding, rubbing, or other abrasive wear of the seat. Likewise, as the flappers close they complete their pivotal movement about the supporting shaft before they contact the seat in the hinge area, thereby also avoiding wear of the seat during closure. In end result, this invention effectively precludes all problems with respect to wear of the seat during either opening or closing of the valve, hence greatly prolonging the life of the seat.

The invention further includes several different arrangements for securing the shaft guides to the valve body, each arrangement for facilitating easy and quick installation and removal of the shaft and the flappers for efficient assembly and disassembly of the valve. The invention is functional in valves with resilient or non-resilient seats, and wherein the resilient seats are affixed to the flappers or to the valve body itself.

Accordingly, one object of the present invention is of provide a new flapper or wafer-type check valve, and especially to provide such a valve with a new system for mounting the flappers in the valve body.

Another object of the present invention is to provide a new means for retaining a check valve's flapper hinge shaft in the valve body so that the flappers will lift off from their seats as the valve opens, and correspondingly will close against these seats as the valve closes, without rubbing or sliding on the seats, thereby eliminating a major cause of wear of the seats.

Still another object of the present invention is to provide a new type of mechanism for retaining the valve closure elements in a check valve body such that they can be quickly and easily installed and removed for service or replacement.

Yet another object of the present invention is to provide a new guide system for securely yet removably retaining the hinge shaft in a flapper-type check valve body, while simultaneously facilitating the shaft's radial displacement in the direction of the valve's flow passage axis to allow the flapper's to seat and unseat without sliding or otherwise moving with respect to the seat in a manner to cause undue wear thereof.

These and additional objects of the invention will become apparent upon reference to the following description and drawings.

BRIEF DESCRIPTION OF THE DRAWINGS

FIG. 1 is a view in elevation of the downstream end of a valve according to this invention, with a portion broken away to better illustrate the outside configuration of the valve's body.

FIG. 2 is a view taken on line 2—2 of FIG. 1, and on a reduced scale, showing the valve as it appears when fully closed and installed between two pipe flanges.

FIG. 3 is a view like FIG. 2, showing the valve's flappers unseated in the area of the hinges just prior to pivoting into open position.

FIG. 4 is a view like FIG. 3, showing the valve as it appears when fully opened.

FIG. 5 is a fragmentary section taken along line 5—5 of FIG. 1, showing the relative positions of the valve body, flapper, shaft, shaft guide, and retaining screw, when the valve is fully closed.

FIG. 6 is a view like FIG. 5, showing another arrangement that employs a resilient pin for securing the shaft guide to the valve body.

FIG. 7 is a view like FIGS. 5 and 6, showing a split ring arrangement for securing the shaft guide to the valve body.

FIG. 8 is a view like FIGS. 5–7, showing a threaded cap screw employed to secure the shaft guide to the valve body.

FIG. 9 is a view like FIGS. 5–8, showing a spring-biased lock pin for securing the shaft guide to the valve body.

FIG. 10 is a view like FIGS. 5–9, showing a threaded pipe plug with an elongated nose for securing the shaft guide to the valve body.

FIG. 11 is another view like FIG. 10, showing a modified version of the threaded pipe plug arrangement of FIG. 10.

FIG. 12 is a view like FIGS. 5–11, but including the pipe flanges of FIG. 2, showing how the shaft guide may be retained in the valve body by a pipe flange of appropriate size.

FIG. 13 is a view similar to FIG. 4, showing a valve like that of FIG. 1 but with the resilient seat positioned in and attached to relieved areas of the valve body.

FIG. 14 is a view of the valve of FIG. 13, but in a fully closed condition.

FIG. 15 is a view like FIG. 14 showing another version of a valve according to the invention, this version having no resilient seat.

DESCRIPTION OF THE PREFERRED EMBODIMENTS

As illustrated in the drawings, a valve assembly 20 according to this invention comprises a valve body 22 of annular configuration with a bore 24 and sealing surfaces 26, 28 (FIG. 2) on its upstream and downstream ends, respectively, which are tightly secured against opposing pipe flanges 30, 32 by bolts 34 when the valve is installed in a pipeline. Usually a fluid seal, such as an annular gasket 36, is provided between the valve body 22 and the pipe flanges 30, 32, so that the bore 24 of the valve essentially becomes an integral part of the pipeline.

The bore 24 functionally provides a cylindrical flow passage 38 through the valve body 22. An annular flange 40, with a downstream-facing surface 42, extends radially into the flow passage, and a transverse post 44, with a downstream-facing surface 46, extends diametrically across the flow passage. The surface 46 intersects, and is coplanar with, the surface 42, and in this version of the valve these two surfaces together support a valve seat 48 of rubber or other suitable material.

Two generally flat valve closure elements or flappers 52, 54, each shaped generally like one-half of a disc, are pivotally mounted by their hinges 56, 58, respectively, on a supporting shaft 60 that extends across the flow passage 38 parallel to the post 44. The shaft 60 is carried or secured in the valve body 22 by shaft guides 62, 64 that reside in longitudinal slots 66, 68, respectively, in the surface of the valve bore 24. The flappers 52, 54 preferably are identical, having flat and smooth downstream surfaces 52a, 54a that come to a fluid-tight rest against the valve seat 48 when the valve closes (FIG. 2), thus completely shutting off flow through the valve.

When the flappers are in their fully opened position as illustrated in FIG. 4, they rest against the sides of the guides 62, 64, which in this version are relieved to form central longitudinal stop ribs 62a, 64a. It should be noted, however, that the sides of the guides need not be relieved to form these stop ribs, and instead can extend uninterrupted between the guide's top and bottom surfaces, such as if the guide is constructed from rectangular bar stock.

The holes in the hinges 56, 58 preferably are large enough to facilitate free pivoting of the flappers on the shaft 60, but are not elongated in any direction. If desired, suitable washers 70 can be included between the hinges 56, 58, and also between the hinges and the shaft guides 62, 64, to insure freedom of movement between these elements.

A helical spring 72, surrounding the central portion of the shaft 60 between the hinges 56, 58, has ends 72a, 72b that bear against the flappers 52, 54, respectively, to bias them into their closed position as illustrated best in FIG. 2. The force exerted by the helical spring against the flappers is sufficient to hold them generally in the closed position, and to facilitate their automatic closure when fluid flow through the valve in the direction of the arrows in FIG. 3 ceases, thereby preventing undesired reversed flow through the valve in the direction of the arrows in FIG. 2.

The shaft guides 62, 64 (FIGS. 1–5) are identical, so that the following description of guide 64 pertains equally to guide 62. As seen best in FIG. 5, the guide 64 has a vertical bore 74 for receiving and retaining the shaft 60, and a horizontal longitudinal bore 76 through which a retainer screw 78 extends. The bore 76 is counterbored at 76a to accommodate the screw's head 78a, which is of larger diameter than the bore 76. Therefore, when the screw is threaded into the tapped hole 80 in the valve body 22, it securely retains the shaft guide 64 in the slot 68.

When the valve is fully closed, the head 78a of the retainer screw 78 is spaced from a shoulder 64b (FIG. 5) at the bottom of the guide's counterbore 76a. This spacing permits the guide 64, and hence the shaft 60 and the flappers 52, 54, to move downstream as the valve begins to open, until the shoulder 64b contacts the screw head 78a. As this movement occurs, the flappers lift off the valve seat 48 in the area of their hinges 56, 58, sufficiently to enable their straight edges 52b, 54b to clear the seat 48 as they pivot on the shaft 60 towards their open position. However, because of the restriction imparted by the screw head 78a against further longitudinal movement of the shaft guide 64 with respect to the valve body 22, the guide, the shaft, and the flappers are positively retained as an assembly in the valve body, yet can easily and quickly be removed therefrom by unthreading the screw 78 from the tapped hole 80.

The foregoing system also functions to prevent wear of the seat 48 when the valve closes, for the flappers complete their pivotal movement about the shaft 60 before they finally move into sealing contact with the seat 48 in the area of their hinges. In other words, during closing the flappers arrive first at the position shown in FIG. 3, and then move into the FIG. 2 position to establish a fluid-tight seal with the seats 48. Therefore, all wear of the seats 48 from sliding, rubbing, etc. contact by the flappers 52, 54 is effectively precluded by this invention, resulting in significantly greater longevity of the seat.

This elimination of wear of the seat 48 is also achieved when it is secured to the flappers 52, 54 instead of to the surfaces 42, 46 of the valve's body 22. In this arrangement, which would of course involve a separate seat on each flapper, as the valve opens the seats lift off the surface 46 of the post 44 before the flappers being to pivot towards their open position about the shaft 60, so that as this pivotal movement occurs the seats clear the edges of the post's surface 46. Likewise, as the flappers close they complete their pivotal movement in a closing direction about the shaft 60 before the seats contact the post's surface 46 or its edges. Hence, no abrading or sliding movement between the seats and the post area of the valve's body occurs, and wear of the seats from such causes is precluded.

As seen in FIG. 5, when the flappers are fully closed against the resilient seat 48, the forward end 64c of the shaft guide 64 is spaced from the surface 46 of the transverse post 44. This spacing facilitates further longitudinal movement of the guide 64 upstream to enable the flappers 52, 54 to compress the seat 48 sufficiently to establish a fluid-tight seal with it. Because of the fact that seats of various thicknesses and resiliencies may be employed in valves of this type, this space is proportionately dimensioned to accommodate any upstream movement necessary to establish a compressive seal with the particular seating element involved.

FIG. 6 illustrates a modified version of the valve assembly 20, with a shaft guide 90 retained in the valve body 22 by means of a pin 92 that slidably fits into a hole 94 in the guide 90 and extends into an opposed longitudinal closed-end slot 96 in the body 22. The pin 92 can be a composite of a rubber or other resilient upper portion 92a, and a nylon or other relatively rigid lower portion 92b. The resilient portion 92a is sufficiently compressible to facilitate pushing the rigid portion 92 entirely into the shaft guide hole 94 so that the guide can be installed in the valve body 22. When the pin 92 arrives opposite the slot 96, the rigid portion 92b will be forced by the resilient portion 92a into the slot, locking the shaft guide 90 into the body 22. Note that in this locked position the rigid portion 92b of the pin 92 resides also in the guide's hole 94, thus achieving a durable retention of the guide 90 in the valve body 22. As shown in FIG. 6, the length of the slot 96 is sufficient to facilitate adequate longitudinal movement of the guide 90 so that the flappers clear the valve seat 48 when they pivot on the shaft 60. As a variation, if desired, the pin 92 can be entirely resilient so long as it has the required capability for retaining the guide 90 in the slot; for example, a sufficiently strong spring could itself be used for this purpose.

Another modified version of the valve assembly 20 is shown in FIG. 7, wherein the shaft guide 100 has a transverse slot 102 that, when installed in the valve body 22, is opposite to an internal annular groove 104 in the body 22. A split ring 106 of steel or other suitable rigid material fits into the slot 102 and the groove 104 to lock the guide into the valve body 22. The ring 106 is sufficiently constrictable to facilitate insertion of the shaft guide 100 into the valve body 22 until the slot 102 is positioned opposite the groove 104, at which time the split ring self-expands into the groove 104. THe width of the groove 104 is dimensioned to facilitate longitudinal movement of the guide 100 necessary to insure clearance of the valve seat 48 by the flappers as they pivot on the shaft 60.

FIG. 8 illustrates another version of the valve assembly 20, wherein the shaft guide 110 is retained within the valve body 22 by a cap screw 112. The screw 112 extends through a threaded hole 114 in the guide and into a longitudinal closed-end slot 116, in the valve body 22. The capscrew 112 is proportioned lengthwise to engage the slot 116 when it is threaded completely into the shaft guide 110, so that by partially unthreading the screw 112 the guide can be inserted or removed from the valve body. As with the slot 96 in the version of FIG. 6, the slot 116 is of sufficient length of facilitate movement of the guide 110 longitudinally a distance adequate to let the flappers pivot on the shaft 60 without touching the valve seat 48.

In FIG. 9 the shaft guide 120 is retained within the valve body 22 by a pin 122 that extends from a hole 124 in the guide into a longitudinal closed-end slot 126 in the valve body 22. The pin 122 is biased by a coil spring 128 towards the slot 126, and thus is held in that slot when the guide is installed. A smaller diameter portion 122a of the pin 122 extends through a commensurately sized hole 130 in the guide 120 to facilitate withdrawal of the pin 122 from the slot 126, so that the guide can be easily removed from the valve body 22. As in the versions of FIGS. 6–8, the slot 126 is long enough to permit longitudinal movement of the guide 120 sufficient to insure the flappers will clear the valve seat 48 as they pivot on the shaft 60.

In the version of the valve assembly 20 illustrated in FIG. 10, the shaft guide 132 is retained within the valve body 22 by a pipe plug 134 threaded into a tapped hole 136 in the guide. The pipe plug has an elongated nose section 138 that extends through a bore 140 in the shaft guide 132 and into a longitudinal closed-end slot 142 in the valve body 22. Thus, by threading the pipe plug 134 into or out of the shaft guide 132, the guide can be easily locked into the valve body 22 or removed therefrom. The nose section 138 can be integral with the pipe plug 134, or it can be a separate element, such as a dowel, a roll pin, or a spring pin that is pressed or threaded into the plug. Here again, the length of the slot 142 affords movement of the guide away from the post 44 to assure clearance of the valve seat 48 by the flappers as they pivot on the shaft 60.

FIG. 11 illustrates a modified version of the structure of FIG. 10, showing a pipe plug nose section 150 with an enlarged head 152. The nose section 150 is fixed to the pipe plug 134, and the shaft guide 154 is relieved at 156 to receive the head 152 when the pipe plug is unthreaded, so that the shaft guide can be readily inserted or removed from the valve body 22. The head 152 also serves as a safety measure in that if the pipe plug 134 should accidentally become unthreaded when the valve is in use, the head will prevent it from being carried away by fluid flowing through the valve. As with the previously described versions, the head 152 extends into an elongated longitudinal slot 158 that is long enough to facilitate movement of the guide 154 downstream a sufficient distance to let the flappers clear the valve seat 48 as they pivot about the shaft 60.

FIG. 12 illustrates the valve assembly 20 mounted between two opposed pipe flanges 160, 162 with an inside diameter equal to the diameter of the valve bore 24. Since the pipe flange 162 effectively constitutes an end to the slot 68 in the valve body 22, it thereby prevents further longitudinal movement of the guide 164 away from the post 44, thus confining the guide within the slot. Accordingly, where the valve bore and the inside diameter of the pipe flange on the downstream end are equal, there is no need for any additional retaining elements such as the previously described cap screws, pins, pipe plugs, etc., to insure that the guide will remain in place. Here, the space between the downstream end 164a of the guide, and the face of the pipe flange 162 or the gasket 166 if one be employed, must be sufficient to facilitate longitudinal movement of the guide for the required flapper clearance factor previously explained.

Therefore, as is apparent from the foregoing description of the several versions of this invention, regardless of which retaining system is used, the guides are free to move longitudinally in the slots a limited distance to let the flappers lift off of the seat 48 in the area of the hinges, as shown in FIG. 3, before these flappers begin to pivot about the shaft 60 towards their open position. Thus, when such pivoting does occur, the straight edges 52b, 54b of the flappers clear the valve seat 48 without rubbing or otherwise wearing it. Likewise, these edges 52b, 54b clear the seat 48 as the flappers pivot from an open position into the position shown in FIG. 3, and subsequently into the fully closed position of FIG. 2.

It should also be observed that when the valve assembly 20 is installed against a downstream pipeline flange having an end face that overlaps the downstream or open ends of the slots 66, 68, these slots are thereby effectively closed, thereby precluding further longitudinal movement of the shaft guides in the slots. Such a relationship provides a secondary retaining system for assuring that the guides, the shaft and the flappers will not move out of operative position in the valve body.

As is illustrated in FIGS. 13 and 14, the invention also can be embodied in a valve wherein the resilient seat is positioned in a relieved or grooved area in the valve's body. In this version the surface 42 of the valve's body 22 is provided with an annular groove 170, and the surface 46 of the post 44 is grooved at 172. The groove 172 intersects the groove 170 at diametrically opposite points to form a continuous relieved area in which a pair of resilient seats 174, 176 are secured, each seat completely encircling one of the upstream flow passages "P." Both seats are axially dimensioned to extend out of the grooves 170, 172 past the downstream-facing surfaces 42, 46, and each seat has a transverse dimension less than the width of the grooves so that a void exists between the grooves and the seats when the valve is open (FIG. 13). When the valve is closed (FIG. 14) and under pressure in the direction of the arrows, the flappers 52, 54 rest against the surfaces 42, 46, thereby compressing the seats in the amount of their extension out of the grooves 170, 172. The void space in the grooves allows the seats to yield to this compressive force without exceeding their elastic limits, so that they will return to their original configuration, as shown in FIG. 13, when the flappers open in response to a pressure buildup in the direction opposite to the arrows of FIG. 14. When the valve is closed, the void in the grooves not occupied by the displaced seat material will allow the pressure to force the seat material toward the contact area of the flappers and the surfaces 42, 46 between the grooves and the upstream flow passages P, thereby energizing or enhancing the seal.

As has been mentioned earlier, this invention also can be employed with a valve having no resilient seat, i.e., a valve in which the flappers close directly against the surfaces 42, 46 of the body 22, as shown in FIG. 15. The flappers will open and close in the same manner and movement as when a resilient seat is present, and thus wear of the flapper's surfaces in their hinge area from rubbing or sliding on the adjacent valve body surfaces and edges of the post 44 is avoided. This is an important feature particularly in valves having relatively soft metal flappers, and that are subject to a high frequency of opening and closing.

Although the best mode contemplated for carrying out the present invention has been herein shown and described, it will be apparent that modification and variation may be made without departing from what is regarded to be the subject matter of the invention.

What is claimed is:

1. A check valve assembly, comprising:
   a. a valve body with a bore defining a flow passage therethrough;
   b. a pair of valve flappers pivotally mounted on a shaft within the flow passage for movement between an open and a closed position;
   c. seat means within the valve body against which the flappers can close to restrict fluid flow through the flow passage; and
   d. guide means for securing the shaft to the valve body to facilitate significant unrestricted translatory movement of said shaft with respect to said valve body in the direction of the axis of the flow passage, whereby the flappers can open and close without abrasion of their surfaces in the area of the shaft.

2. A check valve assembly according to claim 1 wherein the guide means for securing the shaft in the valve body comprises a pair of guides, one at each end of said shaft, retained in elongated open-ended slots that extend generally parallel to the flow passage axis, said guides being freely movable longitudinally in said slots away from and towards the seat means.

3. A check valve assembly according to claim 2 wherein the guides are retained in the slots by adjustable means that facilitate installation and removal of said guides, shaft, and flappers as an assembly into and from the valve body.

4. A check valve assembly according to claim 3 wherein each of the guides has a bore for receiving the shaft, means for restricting pivotal movement of the flappers on said shaft beyond their fully opened position, and retaining means for releasably engaging the valve body to securely but removably retain said guides in said slot.

5. A check valve assembly according to claim 4 wherein the guide retaining means comprises a retaining screw adapted for extending through a longitudinal bore in the guide generally parallel to the flow passage axis and into releasable engagement with a bore in the valve body.

6. A check valve assembly according to claim 4 wherein the guide retaining means comprises a resilient split ring adapted for extending outwardly from a transverse slot in the guide into an annular groove in the valve body, said groove having an axial width greater than the axial dimension of said ring.

7. A check valve assembly according to claim 4 wherein the guide retaining means comprises an elongated pin-like element adapted to extend from a bore in the guide into an elongated longitudinal closed slot in the valve body.

8. A check valve assembly according to claim 7 wherein the pin-like element comprises a rigid shaft fixed at one end to an opposed end of a resilient shaft-like element.

9. A check valve assembly according to claim 7 wherein the pin-like element comprises a helically wound spring.

10. A check valve assembly according to claim 7 wherein the pin-like element comprises a cap-screw adapted for threaded engagement with the guide.

11. A check valve assembly according to claim 7 wherein the pin-like element comprises a rigid shaft with an elongated lifting member of lesser cross-sectional dimension extending from one end thereof, and wherein the guide retaining means also includes resilient means for biasing said pin-like element towards the closed slot when said retaining means and said guide are installed in the valve body.

12. A chick valve assembly according to claim 7 wherein the pin-like element comprises a pipe plug with an elongated nose-like axial extension for engaging the closed slot.

13. A check valve assembly according to claim 12 wherein the axial pipe plug extension terminates in a transverse head for retaining the pin-like element in the guide.

14. A check valve assembly according to claim 1 wherein the seat means includes a resilient seat element secured to the valve body in circumscribing relationship to the flow passage.

15. A check valve assembly according to claim 14 wherein the resilient seat element resides in a groove in the seat means surrounding the flow passage, and wherein the seat element extends significantly out of said groove so that it is compressed when the valve flappers are in their closed position, and wherein said groove has a greater transverse dimension than said seat element to facilitate accommodation of displaced seat element material when said valve flappers are closed.

16. A check valve assembly according to claim 1 wherein the flappers and the seat means are rigid and non-resilient, and wherein said flappers close directly against said seat means.

17. A check valve assembly according to claim 1 wherein the valve body is devoid of passageways extending from surfaces exposed to internal pressures through its wall to its outside surface.

* * * * *

PO-1050
(5/69)

UNITED STATES PATENT OFFICE
CERTIFICATE OF CORRECTION

Patent No. 3,678,958            Dated July 25, 1972

Inventor(s) Satterwhite et al

It is certified that error appears in the above-identified patent and that said Letters Patent are hereby corrected as shown below:

Col. 1, line 44, insert --valve-- before "body".
Col. 4, line 16, change "being" to "begin".
Col. 6, line 43, enclose "P" in quotation marks.
Col. 8, line 12, change "chick" to "check".

Signed and sealed this 24th day of April 1973.

(SEAL)
Attest:

EDWARD M. FLETCHER, JR.            ROBERT GOTTSCHALK
Attesting Officer                      Commissioner of Patents